Aug. 30, 1960   V. L. DUVAL D'ADRIAN   2,950,985
STARCH TREATED FREE FLOWING GLASS BEADS
Filed April 11, 1957

INVENTOR:
VINCENT L. DUVAL d'ADRIAN,
BY Kingsland, Rogers & Ezell
ATTORNEYS

United States Patent Office 2,950,985
Patented Aug. 30, 1960

2,950,985
STARCH TREATED FREE FLOWING GLASS BEADS

Vincent L. Duval d'Adrian, Shrewsbury, Mo., assignor to Flex-O-Lite Manufacturing Corporation, St. Louis, Mo., a corporation of Missouri Filed Apr. 11, 1957, Ser. No. 652,197

7 Claims. (Cl. 117—33)

This invention relates to improvements in glass beads and in particular is concerned with a treated glass bead which has free flowing characteristics.

Glass beads of small particle size have been conventionally used in the past for their reflex light reflective properties when employed with highway marking paints and upon signs which are to be illuminated at night-time by light from automobiles. Such beads are of very small particle size in a general range of about 5 to 1150 microns, and are applied to the surfaces by dispensing from a container. The dispensing operation requires the beads to pass through a directing orifice or the like so that they may be dispensed evenly in a short period of time over a large surface.

The dispensation of small glass beads has been a particular problem in the past due to pick-up of moisture upon the surface which tends to cause slushiness of the beads and prevents uniform dispersion. It can readily be realized that, when one pound of glass beads of a particle size of 50 microns has a surface area of 1200 square feet the pick-up of moisture is a very substantial problem. It is well understood that large surface areas tend to increase moisture pick-up whether by absorption, condensation, or otherwise, and this has presented a serious disadvantage in the art.

Further, glass beads prepared from conventional soda lime glass contain a substantial proportion of free alkali which is deliquescent. When the beads are stored, moisture is taken up in the form of a moist layer formed around the individual beads, which tends to form a slushy conglomerate and in time may even cause cementation.

By means of the instant invention, there has been provided a free flowing glass bead which may be dispensed from bulk quantities in atmospheres of high humidity. Further, the glass beads when treated with the starch treatment of this invention are adapted to be stored for a long period of time and still retain the free flowing characteristics. In this invention, a small amount of finely divided starch is thoroughly mixed with the glass beads which imparts very free flowing characteristics to the beads in bulk quantities and actually seems to provide lubricating qualities, so that the free flowing characteristics are even improved over completely dried beads, per se.

It is a special feature of this invention that the glass beads treated with the starch may be very simply formed by merely mixing a small percentage of finely divided starch, which may be in the neighborhood of one-tenth of one percent in a very simple operation. The treating operation is extremely inexpensive and very efficacious in the results obtained. Through the provision of free flowing beads, the dispensing operation in spreading beads upon highway marking paints has been very substantially improved through the uniformity of dispensation.

Accordingly, it is a primary object of this invention to provide free flowing glass beads in which the beads are treated with starch.

It is a further object of this invention to provide free flowing glass beads which can be uniformly dispensed under varying conditions of humidity by providing a small quantity of starch which is thoroughly mixed with the glass beads.

Still another object of this invention is to provide free flowing glass beads which have increased lubricating properties under varying conditions of humidity obtained by a treatment of starch which does not impair the reflective characteristics of the beads.

Yet another object of this invention is to provide a starch treated glass bead which has free flowing characteristics when the beads are dispensed from a bulk container and in which the treated beads resist conglomeration when stored over a long period of time.

Still another object of this invention is to provide a free flowing starch treated bead which can be safely employed with oleoresinous paints without adverse effect upon retention in the dried film of paint and upon the reflective powers of the bead.

Further objects of this invention will appear in the detailed description which follows and will be further apparent to those skilled in the art.

For the purpose of illustration of the improved free flowing characteristics of the starch treated glass beads of this invention, there are shown in the accompanying drawings tables showing comparative performance of the starch coated beads with ordinary untreated glass beads and an enlarged fragmentary drawing of a mixture of the glass beads and the starch.

According to this invention the glass beads are treated with starch by mixing quantities of starch in the general proportion of about .1 of 1% to as low as .01 of 1% with the bulk beads. This mixing may be effected in conventional mixing devices or tumbling apparatus so that the starch is very intimately mixed throughout the quantity of beads.

Figure 3:
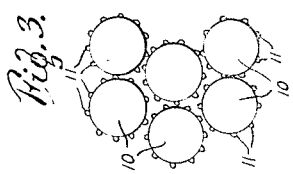
Figure 3 is an enlarged fragmentary drawing of a mixture of the glass beads and the starch.

Referring now to Figure 3 the enlarged drawing therein shows glass beads 10 in bulked form with small particles of starch 11 adhering to the outside surfaces of the glass beads. These starch particles provide an interface between the beads and effect the flowing properties of the beads and act as a lubricant between the individual bead particles.

The starch as a general rule should be of a powdered form and have a fine particle size which is smaller than the size of the glass beads. As an actual example one pound of corn starch of finely divided nature may be mixed with 1,000 pounds of conventional soda lime glass beads. The starch should be used in finely divided form, and as an example, it has been found that starch in which the majority of particles pass through a 400 mesh screen can be employed advantageously. As a general rule, it can be stated that the starch particles should be substantially smaller than the glass beads which may be of a size as small as to pass through 230 mesh United States Standard screen. These beads are mixed with the starch very thoroughly to disperse the particles of starch between the beads to provide free flowing characteristics. In this mixing operation the dispersion of the small particles of starch between the larger glass beads seems to act as a lubricant even under moist conditions and in atmospheres of high humidity. It has further been found that the mixing operation may be carried out under conditions of high humidity or even when the beads are slightly moist. Various types of starch may be employed, although corn starch has been found to be very well adapted for this application. Other normal types of starch which are substantially insoluble under the conditions encountered may also be used.

It has further been found that when beads are treated according to the formulation described above, the light reflective properties are not impaired in any manner. This is a very important characteristic as the glass beads are primarily desired for applications upon highway marking paints and on sign surfaces, and for the illumination of roadside signs in the nighttime. It is a further signal feature of this invention that conventional soda lime glass beads may be very efficaciously employed under conditions of high humidity where previously cementation, slushiness and conglomeration prevented very effective dispensation. Since soda lime glass beads are very cheaply manufactured their availability for use under high humidity conditions where previously they were not satisfactorily employed, is a very attractive and advantageous advance in the art.

The glass beads in the actual application upon highway marking paints or upon other surfaces that are desired to be imparted with light reflecting characteristics is by dispensation through small orifices or openings for uniform dispersion. It can readily be understood that where such type of dispensation is employed, moisture pick-up by conventional glass beads would readily reduce the number of beads dispensed and would cause uneven dispersion. Thus, it has been found that under relative humidity of about 60%, a very serious problem has been encountered by fall off of up to 50% of the beads dispensed. Under highly humid conditions of humidities of 80 to 90%, beads would not even flow. Through the use of the treated beads of this invention, uniform dispersion has been made possible as will be more definitely described below with respect to the graphs of Figures 1 and 2.

Figure 1:
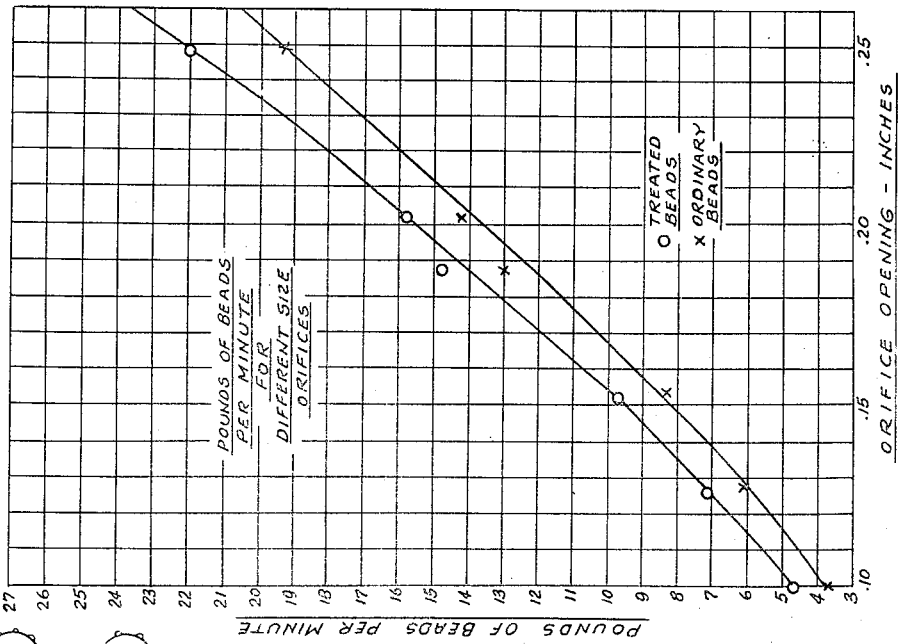
Figure 1 is a graph comparing the amount of starch treated beads to ordinary beads dispensed through differently sized orifice openings under absolutely dry conditions.

Reference will now be had to Figure 1 showing the advantages of using the coated beads over ordinary beads under dry conditions. In the tests shown in Figure 1 beads were dried by baking in an oven before the tests were conducted. In the tests carried out glass beads were poured into a funnel on top of a dispenser having the orifice openings in the form of a slot 4 inches long to from 0.10 to 0.25 inch wide as indicated in the graph. For the orifice opening of 0.10 inch, it will be seen that the ordinary untreated beads were dispensed in the amount of about 3.8 pounds of beads per minute. For this same size opening, the starch treated beads were dispensed in the amount of about 4.8 pounds per minute which demonstrates an increase of approximately 25%. At the other end of the graph for the orifice opening of 0.25 inch, the ordinary beads were dispensed in the amount of about 19.3 pounds per minute, while the starch treated beads were dispensed at about 22.1 pounds per minute. This represents an increase in flow of about 14.5 percent.

Over the entire range of the graph of Figure 1 an increase on the average of about 16⅔% or an increase of one-sixth over the flow of ordinary beads was realized through the use of the starch coated beads. This indicates that the starch serves as a lubricant under the dry conditions to increase the flow of the beads.

Figure 2:
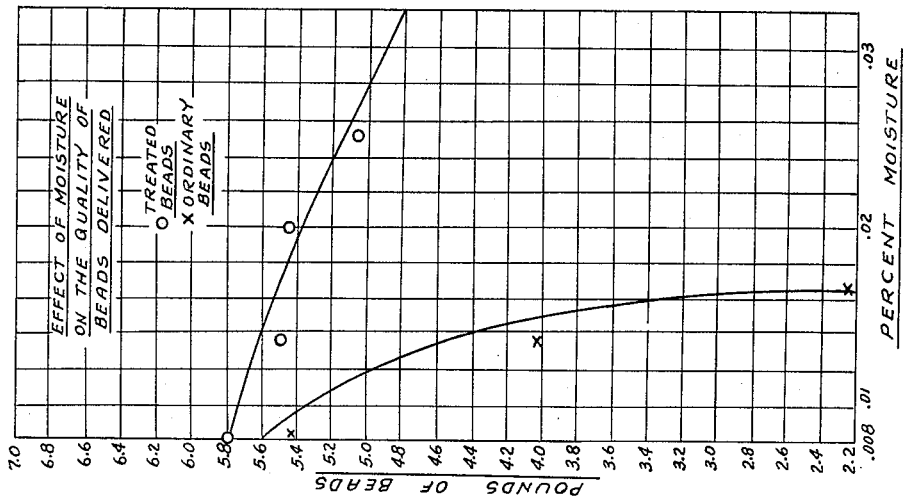
Figure 2 is a graph showing the effect of moisture on the quantity of beads delivered through an orifice comparing the amounts of untreated beads delivered to the starch treated beads delivered.

The graph of Figure 2 illustrates the effect of moisture on the quantity of uncoated beads delivered through an orifice and the quantity of beads coated according to this invention. In carrying out this test the beads were placed in a dispensing apparatus having an orifice set to deliver 6 pounds of dry untreated beads per gallon of ordinary oleoresinous paint at a movement of a dispensing apparatus at the speed of six miles per hour. This corresponds to about 612 pounds of beads dispensed per hour as about 17 gallons of paint are used per mile. The tests were carried out with varying percentages of moisture added to the control of the ordinary untreated beads and the starch treated beads of this invention.

It will be observed that in the first comparative test corresponding to 0.008% moisture the amount of starch coated beads was reduced to 5.8 pounds of beads dispensed per gallon. This corresponded to a reduction to a little less than 5.6 pounds of uncoated beads. With an increase of the moisture content to a little less than 0.014%, it was found that the starch treated beads were dispensed at about 5.45 pounds while the untreated beads were dispensed at about 4 pounds.

The reduction in the glass beads which were not treated was very marked at a moisture content of about .017% since the beads delivered were in the amount of about 2.3 pounds. At a greater moisture percentage of the starch treated beads of about 0.02% some 5.4 pounds were still delivered.

Thus it can be seen at moisture contents exceeding about 0.015% that the drop off of amount of glass beads which are untreated is so substantial that they cannot be satisfactorily applied through a dispensing apparatus. However, on the contrary, starch treated glass beads can be satisfactorily dispensed even at moisture contents approaching 0.025% as more than 5 pounds were delivered according to the graph of Figure 2.

Thus, Figure 2 graphically displays the very beneficial and marked improvements provided through the starch coated beads of this invention. It can readily be seen that starch treated beads can be employed in conditions of high humidity where ordinary glass beads simply could not be employed in any manner due to the resistance to flow.

As a further example of the advantages in retention of free flowing properties of glass beads treated according to this invention, the treated beads were stored in paper bags for a period of 18 months. At the end of this period, during which the humidity was as high as 90%, the beads showed no tendency to cement together and were as good as freshly mixed beads. Standard untreated beads which stand under similar conditions are completely unsuitable for use.

Moisture may be picked up from a number of different sources. Thus the moisture besides being absorbed by the glass beads by humidity, can be obtained from the bags used in packing and from laying cool beads on a hot concrete floor, as quite often happens in the production of the beads. Further, moisture can be picked up from applying cold beads in a warm dispensing hopper or into a wet hopper and dispenser. Thus it is quite difficult to prevent moisture pick-up and the starch treated beads of this invention possessing free flowing characteristics have very effectively reduced the problems of proper dispensation.

In practice it has also been required previously to clean out bead dispensing apparatus after use without allowing to stand overnight because of moisture pick-up. This pick-up was by condensation, absorption, etc., and was found to cause slushiness and uneven dispensation when the apparatus was next used. By means of the instant invention this requirement has been obviated and the apparatus need not be cleaned out after each day's use.

Finally it has been found by actual application that when the starch treated beads are mixed with oleoresinous paint as in the 6 pounds per gallon application of Figure 2, the complete compatibility is obtained. The starch has no adverse effect upon retention in the dried paint film nor in reflectivity and is inert in the paint. Actually, the application is improved because of more even dispensing. This has been found to be of great advantage since experimentation has been made with other agents such as the stearates which have been found to be undesirable in a paint application.

Various changes and modifications may be made in this invention as will be apparent to those skilled in the art. Such changes and modifications are within the scope and teaching of this invention as defined by the claims appended hereto.

What is claimed is:

1. Substantially dry spherical glass beads of small particle size essentially containing only moisture from the atmosphere and ranging up to about 1150 microns in diameter having improved flow characteristics under adverse conditions of moisture when bulked together, said beads being individually separated from one another when bulked together by finely divided starch particles, said starch particles being of substantially less particle size than that of the glass beads and added in the ratio of about 0.01 to 0.1% of the weight of the beads.

2. Substantially dry spherical glass beads of small particle size essentially containing only moisture from the atmosphere and ranging up to about 1150 microns in diameter having a good degree of reflectivity and transparency and improved flow characteristics under adverse conditions of moisture when bulked together, said beads being individually separated from one another when bulked together by finely divided starch particles, said starch particles being of substantially less particle size than that of the glass beads and added in the ratio of about 0.1% by weight.

3. A reflex light reflective painted surface comprised of a dried paint film upon said surface and reflex light reflective glass beads ranging up to about 1150 microns in diameter firmly secured on the surface of said paint film and being bounded by small particles of starch, said starch particles being of substantially less particle size than that of the glass beads and added in the ratio of about 0.01 to 0.1% of the weight of the beads.

4. A process for imparting free-flowing characteristics to bulk-contained small substantially dry glass beads essentially containing only moisture from the atmosphere and ranging up to about 1150 microns in diameter which comprises adding starch in the form of finely divided solid particles to the beads, said starch being added in the range of about 0.01 to 0.1% of the weight of the beads, intimately mixing the beads and the starch together to form a layer of starch between the individual glass beads.

5. A process for imparting free-flowing characteristics to bulk-contained small substantially dry glass beads essentially containing only moisture from the atmosphere and ranging up to about 1150 microns in diameter which comprises adding starch in the form of finely divided solid particles to the beads and intimately mixing the beads and the starch together to form a layer of starch between the individual glass beads, said starch being added in the ratio of about one pound of starch to about one thousand pounds of glass beads.

6. A process for imparting free-flowing characteristics to bulk-contained small substantially dry soda lime glass beads essentially containing only moisture from the atmosphere and ranging up to about 1150 microns in diameter to increase the ability of the beads to flow under adverse moisture conditions which comprises adding a small amount of starch in the form of finely divided solid particles to the beads, said starch being added in an amount to increase the free-flowing characteristics of the beads, and added in the ratio of about 0.01 to 0.1% of the weight of the beads, and intimately mixing the beads and the starch together to form a layer of starch between the individual glass beads.

7. A process for imparting free-flowing characteristics to bulk-contained substantially dry small glass beads essentially containing only moisture from the atmosphere and ranging up to about 1150 microns in diameter dispensed with paint to provide a reflex light reflective painted surface which comprises adding a small amount of starch in the form of finely divided solid particles to the beads, said starch being added in an amount to increase the free-flowing characteristics of the beads, and added in the ratio of about 0.01 to 0.1% of the weight of the beads, intimately mixing the beads and the starch together to form a layer of starch between the individual glass beads and dispensing the beads upon the top surface of a freshly applied painted surface.

References Cited in the file of this patent

UNITED STATES PATENTS

| | | |
|---|---|---|
| 2,326,634 | Gebhand et al. | Aug. 10, 1943 |
| 2,338,717 | Harman | Jan. 11, 1944 |
| 2,403,752 | Phillippi | July 9, 1946 |
| 2,443,290 | Bauer | June 15, 1948 |
| 2,574,971 | Heltzer | Nov. 13, 1951 |
| 2,614,945 | Krisan | Oct. 21, 1952 |